United States Patent
Watanabe

(10) Patent No.: US 11,774,949 B2
(45) Date of Patent: Oct. 3, 2023

(54) PRODUCTION SYSTEM AND PRODUCTION METHOD

(71) Applicant: SEIKO EPSON CORPORATION, Tokyo (JP)

(72) Inventor: Ryoki Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 620 days.

(21) Appl. No.: 16/584,571

(22) Filed: Sep. 26, 2019

(65) Prior Publication Data

US 2020/0103863 A1 Apr. 2, 2020

(30) Foreign Application Priority Data

Sep. 28, 2018 (JP) ................................ 2018-184164

(51) Int. Cl.
*G05B 19/418* (2006.01)

(52) U.S. Cl.
CPC ..................... *G05B 19/4184* (2013.01); *G05B 2219/33228* (2013.01); *G05B 2219/39146* (2013.01)

(58) Field of Classification Search
CPC ...... G05B 19/4184; G05B 2219/33228; G05B 2219/39146; G05B 2219/31355; G05B 19/41815; G05B 2219/31088; G05B 2219/32202; Y02P 90/02; B25J 9/1674; B25J 9/1682
USPC ........ 228/47.1 or, 49.1; 219/86.1; 700/99 or, 700/96
See application file for complete search history.

(56) References Cited

U.S. PATENT DOCUMENTS

| 6,400,999 B1 | 6/2002 | Kashiyama et al. |
| 11,016,468 B1 * | 5/2021 | Barker ............... G05B 19/4065 |
| 2013/0187382 A1 * | 7/2013 | Haag ....................... F03D 9/255 |
| | | 290/55 |
| 2017/0153625 A1 * | 6/2017 | Yamamoto ......... G05B 19/4063 |
| 2020/0058081 A1 * | 2/2020 | Saneyoshi .......... G06Q 10/0631 |

FOREIGN PATENT DOCUMENTS

| EP | 2267305 B1 * | 1/2016 | ............. F03D 17/00 |
| JP | 2000-052200 | 2/2000 | |
| JP | 2000-141047 | 5/2000 | |
| JP | 2000263388 A * | 9/2000 | |

(Continued)

*Primary Examiner* — Thomas C Lee
*Assistant Examiner* — Michael Tang
(74) *Attorney, Agent, or Firm* — WORKMAN NYDEGGER

(57) ABSTRACT

A production system includes a first manufacturing machine and a second manufacturing machine. The production system also includes a production control unit configured to control productivities of the first and second manufacturing machines. In response to detecting a breakdown sign in the first manufacturing machine, a stop time of the first manufacturing machine is predicted. After the detection of the breakdown sign and before the first manufacturing machine stops, the productivity control unit updates the productivities of the first and/or second manufacturing machines, causing the first manufacturing machine and/or the second manufacturing machine to have an updated productivity equal to or greater than its original productivity, such that a total productivity of the first manufacturing machine and the second manufacturing machine increases.

8 Claims, 11 Drawing Sheets

(56) References Cited

FOREIGN PATENT DOCUMENTS

| JP | 2017-102554 | 6/2017 | | |
|----|-------------|--------|---|---|
| WO | 2016-189603 | 12/2016 | | |
| WO | WO-2016189603 A1 * | 12/2016 | ........... | G05B 19/418 |

* cited by examiner

PRODUCTION SYSTEM AND PRODUCTION METHOD

The present application is based on, and claims priority from JP Application Serial Number 2018-184164, filed Sep. 28, 2018, the disclosure of which is hereby incorporated by reference herein in its entirety.

BACKGROUND

1. Technical Field

The present disclosure relates to a production technology to carry out production using a plurality of machines.

2. Related Art

Recently, a production system that makes a plurality of machines or robots (hereinafter simply referred to as manufacturing machines) collaborate with each other is increasingly used, due to labor saving and automation at plants that produce various products. In such a production system, when one of the manufacturing machines forming the system breaks down, the efficiency of the entire system drops. Thus, an attempt is made to detect a sign of a breakdown in a manufacturing machine, prepare a replacement component before a breakdown, and reduce the period during which the production system is stopped. It is also proposed, as in JP-A-2017-102554, that control should be performed to reduce the workload of a manufacturing machine where a sign of a breakdown is detected and to increase the workload of the other manufacturing machines, when it takes a long time to prepare a replacement component.

However, in the technique of JP-A-2017-102554, the workload of the other manufacturing machines than the manufacturing machine where a sign of a breakdown is detected is increased in order to maintain the efficiency of the production system. Therefore, the deterioration of the other manufacturing machines accelerates, compared with when a sign of a breakdown is not detected. Consequently, there is a risk of a breakdown in the other manufacturing machines.

SUMMARY

The technique according to the present disclosure can be implemented in the following form. That is, a production system operating a plurality of manufacturing machines, based on a plan of an amount of production, includes: a first manufacturing machine being one of the plurality of manufacturing machines and carrying out first work; a second manufacturing machine being one of the plurality of manufacturing machines and carrying our second work, the second manufacturing machine being configured to carry out, as a substitute, at least a part of the first work of the first manufacturing machine; a planning unit planning a total productivity that is a total productivity of the first and second manufacturing machines, according to a total amount of production planned as an amount of production for a predetermined period; a detection unit acquiring a quantity of state representing an operation state from the first manufacturing machine, and detecting a sign of a breakdown in the first manufacturing machine; a prediction unit predicting a stop time that is a time when operation of the first manufacturing machine stops due to the breakdown, when the detection unit detects the sign of the breakdown; a decision unit deciding a maintenance time that is a time when the first manufacturing machine stopping operating due to the breakdown can be returned into a normal state; and a production control unit controlling an amount of operation of each of the first manufacturing machine and the second manufacturing machine in such a way as to achieve a first total productivity that is the total productivity planned by the planning unit. When the sign of the breakdown in the first manufacturing machine is detected and the predicted stop time is earlier than the maintenance time, the production control unit controls at least the amount of operation of the first manufacturing machine to be equal to or greater than an amount of operation before the sign of the breakdown is detected, and the production control unit performs productivity increase control to change the total productivity to the stop time to a second total productivity higher than the first total productivity.

DESCRIPTION OF EXEMPLARY EMBODIMENTS

A. Hardware Configuration in Embodiment

Figure 1:
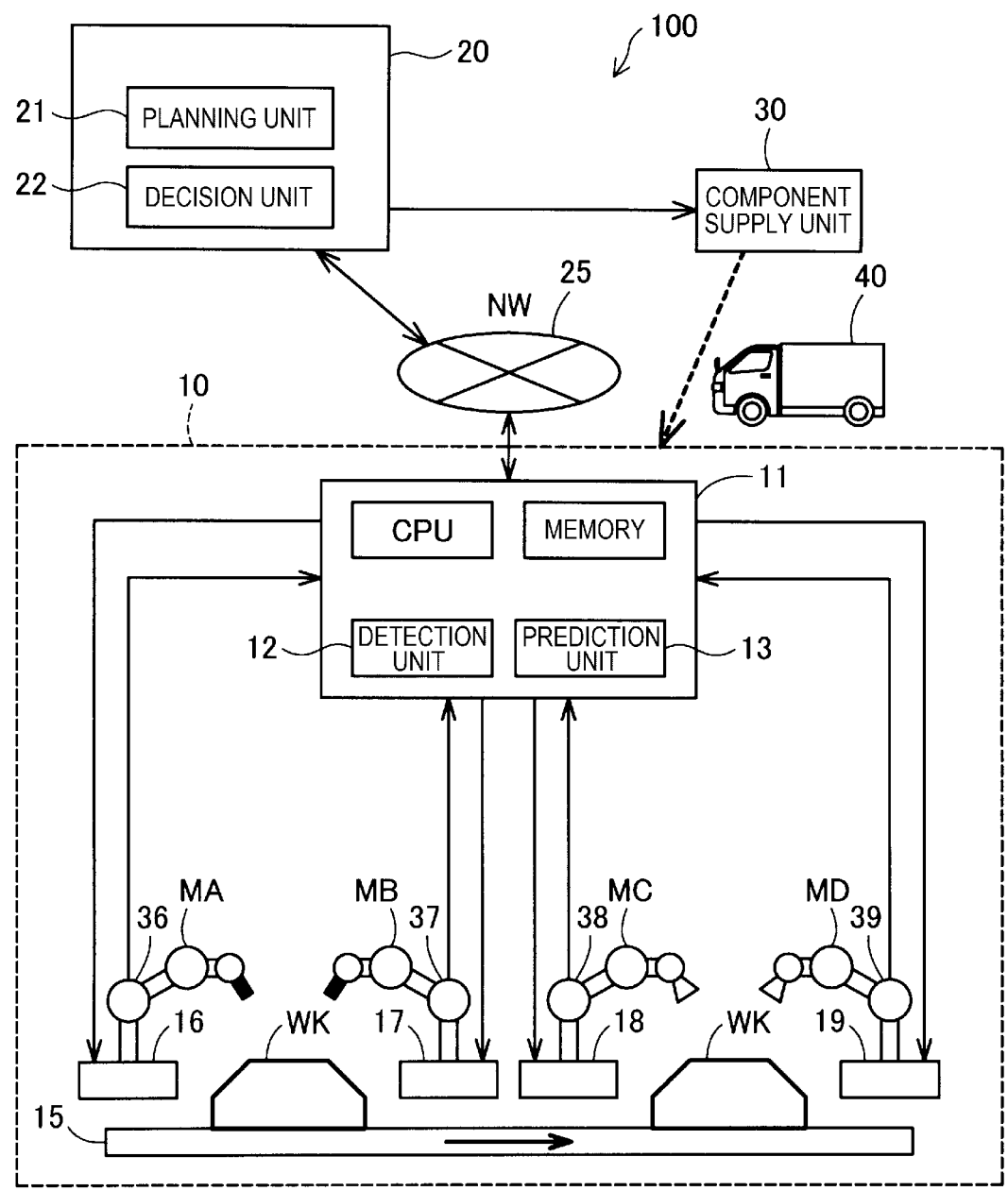
FIG. 1 is a schematic configuration view showing a configuration of a production system according to a first embodiment.

FIG. 1 is a schematic configuration view showing the configuration of a production system 100 according to a first embodiment. The production system 100 includes a plant 10 where a plurality of manufacturing machines MA, MB, MC, MD is installed, and a production headquarters 20 as a planning unit that can communicate with the plant 10 via a wide area network (NW) 25. The production headquarters 20 can place an order for a component with a component supply unit 30 which is an external vendor or the company's own warehouse. The component supply unit 30 delivers the ordered product in a shortest delivery time to the plant 10, for example, using a truck 40 or the like.

At the plant 10, a production control unit 11 overseeing and controlling the manufacturing machines MA, MB, MC, MD is provided. The production control unit 11 outputs a drive instruction to drive units 16, 17, 18, 19 provided in the manufacturing machines MA, MB, MC, MD and thus controls operations of the respective manufacturing machines MA, MB, MC, MD. The manufacturing machines MA, MB, MC, MD are intelligent devices and are so-called robots autonomously carrying out a preprogrammed operation. In this embodiment, the manufacturing machines MA, MB of the manufacturing machines MA, MB, MC, MD are welding robots, and the manufacturing machines MC, MD are painting robots.

These manufacturing machines MA, MB, MC, MD carry out spot welding and painting on a workpiece WK transported by a conveyor 15, at a required number of sites in a takt time designated by the production control unit 11. The manufacturing machines MA, MB, MC, MD have data collection devices 36, 37, 38, 39 collecting a quantity of state representing an operation state in order to acquire the operation status of the manufacturing machine and outputting the quantity of state to the production control unit 11. The quantity of state is, for example, the torque or the number of rotations of a motor or the like provided in the manufacturing machines MA, MB, MC, MD, the electric power required for this, vibration occurring on the drive shaft of the motor, and the like.

The production control unit 11 is configured as a computer having a built-in processor and memory. For the operations of the manufacturing machines MA, MB, MC, MD, the production control unit 11 controls an amount of operation of each of the manufacturing machines MA, MB, MC, MD, described later. In this embodiment, the amount of operation is defined as an operation time and a work speed allocated to each manufacturing machine. The production control unit 11 has a detection unit 12 and a prediction unit 13. The detection unit 12 detects a sign of a breakdown in the manufacturing machines MA, MB, MC, MD, based on the quantity of state received from the data collection devices 36, 37, 38, 39. Meanwhile, when a sign of a breakdown is detected, the prediction unit 13 predicts a breakdown time of the data collection devices 36, 37, 38, 39 where the sign of the breakdown is detected. The control of the manufacturing machines at the plant using the detection unit 12 and the prediction unit 13 will be described in detail later.

The production headquarters 20 is configured as a computer having a built-in processor and memory. The production headquarters 20 has a planning unit 21 and a decision unit 22. The production headquarters 20 oversees the production at the plant 10. The production headquarters 20 sends a production instruction to the plant 10 and receives the production status at the plant 10, via the network 25. The production headquarters 20 plans and changes the production at the plant 10. Specifically, in the case of welding the production headquarters 20 allocates the number of spot-welded sites by the manufacturing machines MA, MB and the time required for completion of welding or the like. At the production headquarters 20, the capability of each of the manufacturing machines MA, MB in the plant 10, that is, a range from a lower limit value to an upper limit value of the time required for moving an arm to a place of spot welding (work speed) or the like, is stored in advance as basic data. Therefore, the production headquarters 20 sets a spot-welded site and a welding order for each of the manufacturing machines MA, MB in such a way that the takt time (work time) to complete welding on the workpiece WK becomes shorter. A setting about where each manufacturing machine spot-welds and how many sites in total each manufacturing machine is responsible for, that is, the operation time and the work speed, are hereinafter referred to as an amount of operation for each manufacturing machine. The same applied to the manufacturing machines MC, MD for painting. The planning unit 21 plans an amount of operation for each of the manufacturing machines MA, MB, MC, MD.

The decision unit 22 specifies a maintenance time of the plant 10. The maintenance time is the time when a manufacturing device that stops operating due to a breakdown can be returned into the operating state by replacing the broken component or manufacturing machine. Specifically, it is the time when a manufacturing machine where a sign of a breakdown is detected or its component is delivered to the plant 10 after an order for the manufacturing machine or its component is placed with the component supply unit 30. Of course, this case is not limited to measures such as replacing the component and includes a case where the manufacturing machine is restored into the operating state by adjusting the manufacturing machine or supplying a consumable element. The adjustment or the like may need a dedicated sensor or device, and it may take time to procure such a device. Similarly, a consumable element such as lubricating oil or catalyst can be a factor that affects the maintenance time. The maintenance time influenced by such a factor may be specified by a computer based on ordering and exchanging delivery information online. The maintenance time may also be specified by a person in charge handling the ordering and delivery information, specifying the maintenance time, and inputting the maintenance time from a terminal at the production headquarters 20. In this case, the maintenance time is manually inputted and the decision unit 22 only performs processing to specify this.

When the manufacturing plan is made using an absolute date and time such as a certain hour and minute on a certain day of a certain month to start manufacturing, the maintenance time is an absolute date and time such as a certain hour and minute on a certain day of a certain month when a component or the like can be replaced. Also, when the manufacturing plan sets the date and time of starting manufacturing as the start point 0 of production, the maintenance time is specified as a relative time from this start time. In this embodiment, the manufacturing plan or the like is made by the latter technique, and the maintenance time is counted from the value 0 and denoted by a sign Tm. Similarly, a time when a sign of a breakdown is detected is referred to as a sign-of-breakdown time and denoted by a sign T0. A time when a breakdown is predicted to actually occur, making the manufacturing machine unavailable for use, is referred to as a breakdown time and denoted by a sign Td.

B. Processing at Production Headquarters

Figure 2:
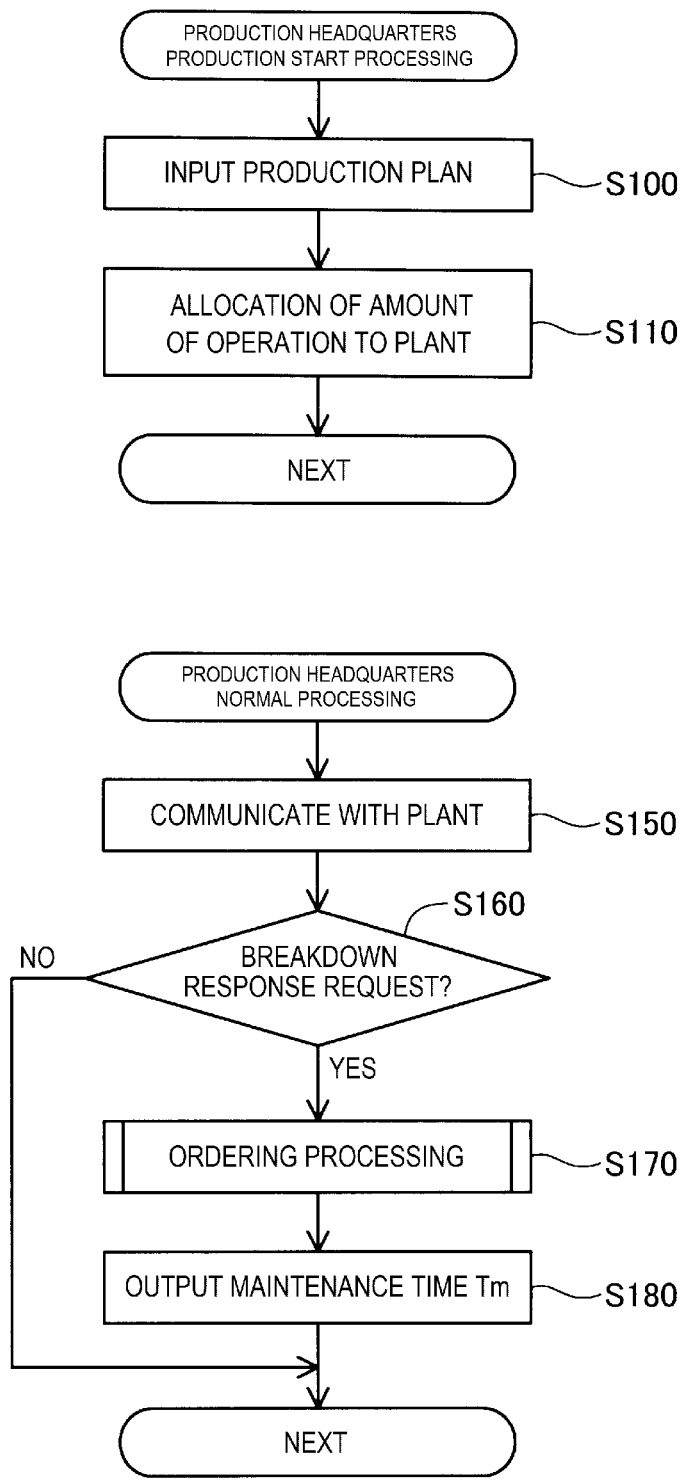
FIG. 2 is a flowchart showing production headquarters production start processing and production headquarters normal processing, which are two types of processing carried out at a production headquarters.

FIG. 2 is a flowchart showing each of production headquarters production start processing and production headquarters normal processing, which are two types of processing carried out by the production headquarters 20. The production headquarters production start processing is processing carried out by the production headquarters 20 before production at the plant 10 and includes steps S100 and S110. First, a production plan for the production system 100 about what to produce, how many, and by when, is made by a manager of the plant 10 or the like and inputted to the production headquarters 20 (step S100). The production headquarters 20 decides allocation of the amount of operation of each manufacturing machine in such a way as to achieve the production plan by the manufacturing machines MA, MB, MC, MD arranged at the plant 10, and outputs this allocation to the plant 10 (step S110).

Figure 3:
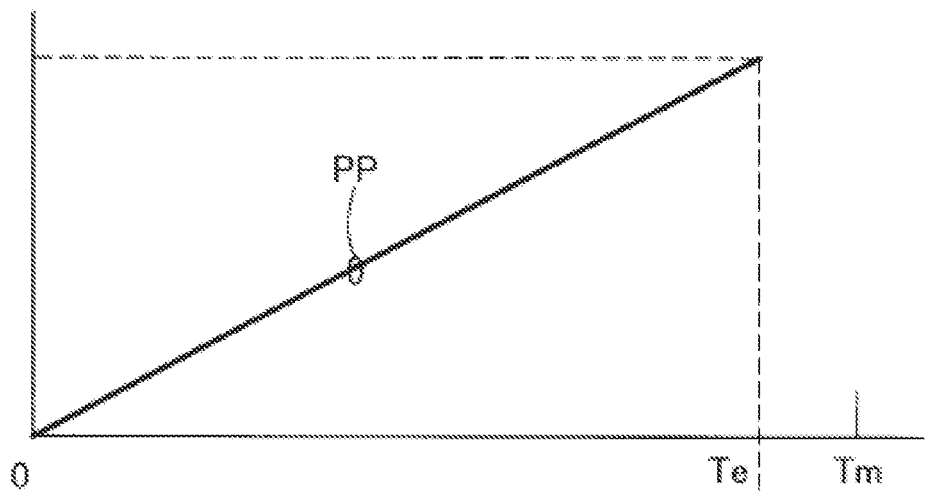
FIG. 3 is an explanatory view showing how the amount of operation of each manufacturing machine is allocated, based on a plan of the amount of production inputted to the production headquarters.
Figure 3:
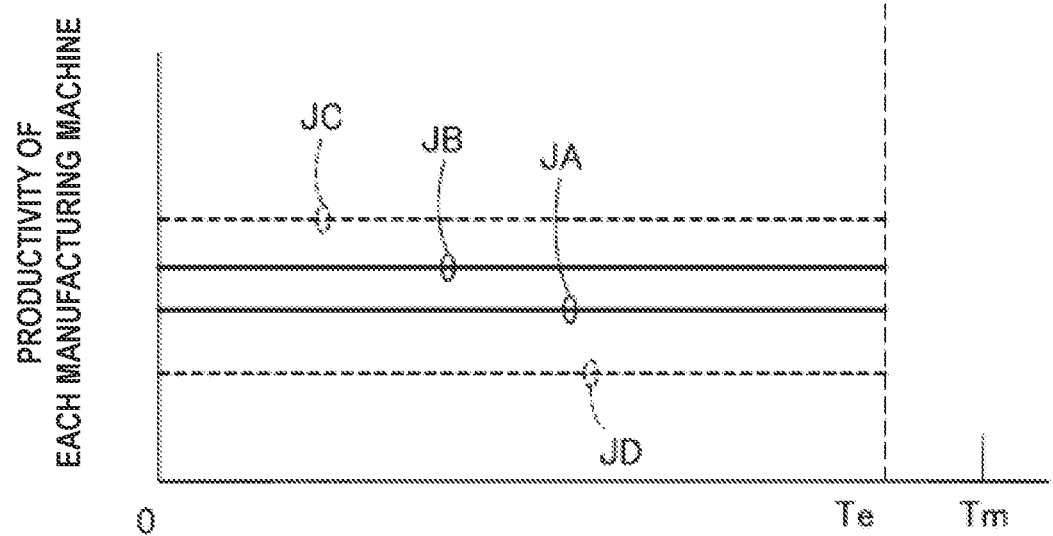

FIG. 3 is an explanatory view showing how the amount of operation of each of the manufacturing machines MA, MB, MC, MD is allocated, based on the production plan inputted to the production headquarters 20. The production headquarters 20 decides an amount of production per unit time from the start of production (date and time 0) to a production end time Te when production by a target amount of production is completed, that is, productivity, according to the production plan, that is, how many to produce and by when, and prescribed an amount of production PP for this period. The production headquarters 20 then decides a necessary amount of operation of the manufacturing machines MA, MB, MC, MD to achieve the amount of production PP. At the bottom of FIG. 3, the amount of operation per unit time of each of the manufacturing machines MA, MB, MC, MD is shown as JA, JB, JC, JD in a graph. The amount of operation of each of the manufacturing machines MA, MB, MC, MD is decided within a range such that the manufacturing machines MA, MB, MC, MD can stably operate without any breakdown. Normally, the same amount of operation is set for the manufacturing machines MA, MB performing the same spot welding, and the same amount of operation is set for the manufacturing machines MC, MD performing the same painting. However, in FIG. 3, different amounts of operation are set for the respective manufacturing machines MA, MB, MC, MD, for the sake of convenience of the description.

The production headquarters normal processing, which is the other processing executed by the production headquarters 20, is processing executed by the production headquarters 20 in collaboration with the plant 10 after the production starts at the plant 10. This processing includes steps S150 to S180 shown in FIG. 2. As the production starts at the plant 10, the production headquarters 20 periodically communicates with the plant 10 (step S150) and receives the presence/absence of a breakdown response request from the plant 10 (step S160). The breakdown response request is a request made by the production control unit 11 of the plant 10 for the production headquarters 20 to procure a replacement component or the like, when a breakdown occurs in a manufacturing machine at the plant 10 or when a sign of a breakdown is detected.

On determining that a breakdown response request is made by the plant 10 (YES in step S160), the production headquarters 20 carries out ordering processing for a replacement component or the like (step S170). The production headquarters 20 then decides a time when the manufacturing machine can operate on completion of replacement after the replacement component or the like is delivered to the plant 10, that is, a maintenance time Tm, and outputs this to the plant 10 (step S180). The maintenance time Tm is finalized as the component supply unit 30 sends back a fixed date for delivery to the production headquarters 20 in response to the order for the replacement component placed with the component supply unit 30 by the production headquarters 20. In this embodiment, the maintenance time Tm is outputted to the plant 10 via the production headquarters 20 as described above. However, the maintenance time Tm can be outputted to the plant 10 directly from the component supply unit 30.

Figure 4:
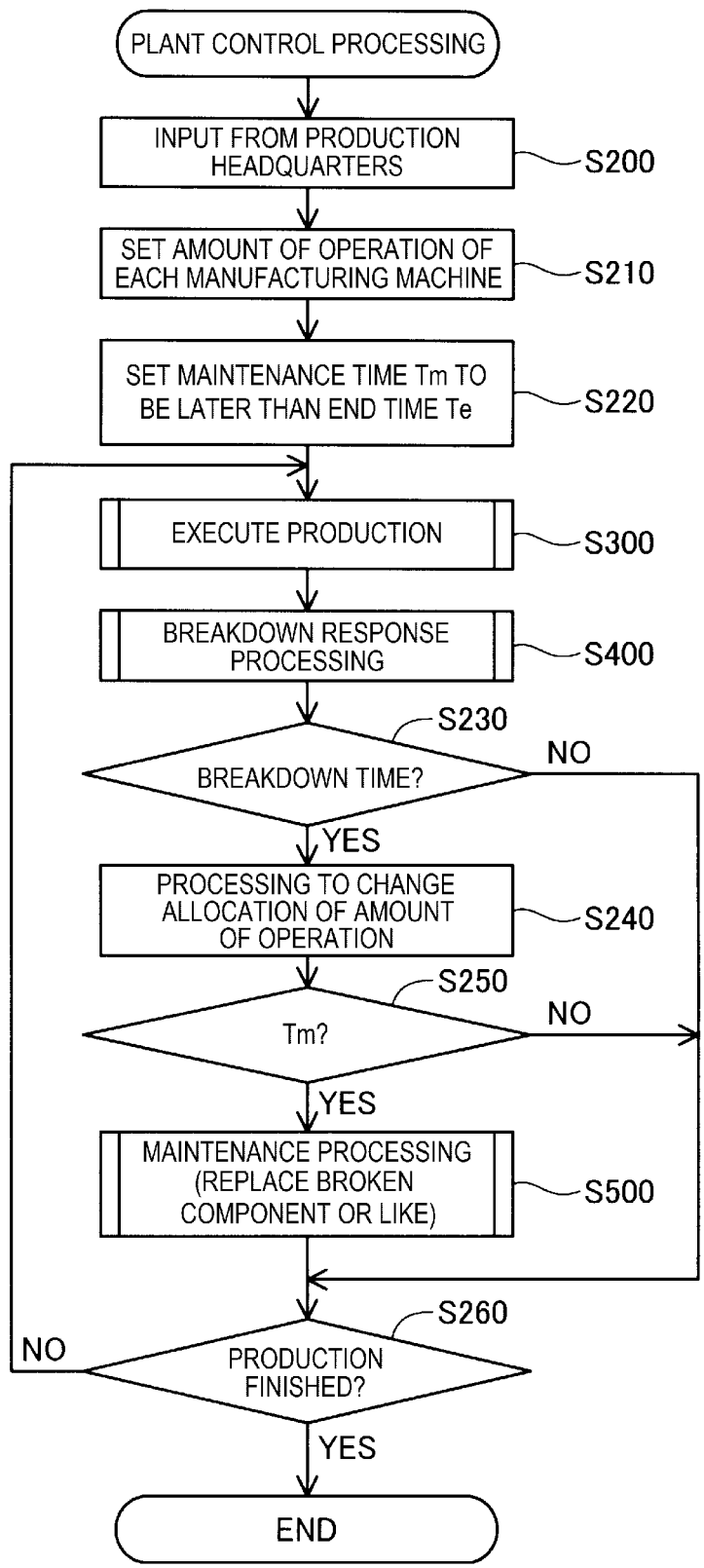
FIG. 4 is a flowchart showing plant control processing executed by a production control unit in order to control production at a plant.
Figure 5:
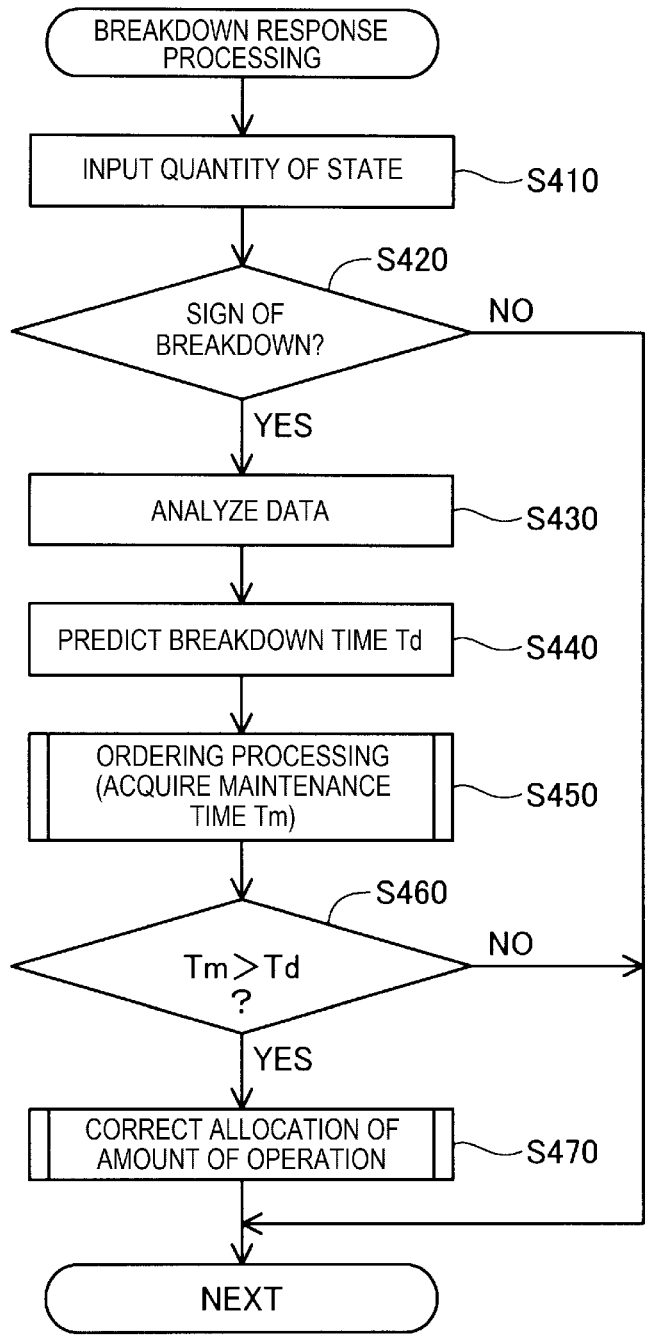
FIG. 5 is a flowchart showing details of breakdown response processing in the plant control processing.

Next, processing executed by the production control unit 11 at the plant 10 will be described with reference to FIGS. 4 and 5. FIG. 4 is a flowchart showing plant control processing executed by the production control unit 11 in order to control production at the plant 10. FIG. 5 is a flowchart showing details of breakdown response processing in the plant control processing.

As the processing shown in FIG. 4 for production is started, the production control unit 11 first takes an input of the amount of operation of each of the manufacturing machines MA, MB, MC, MD outputted from the production headquarters 20 in step S110 of FIG. 2 (step S200). Next, the production control unit 11 sets an amount of operation of each of the manufacturing machines MA, MB, MC, MD, using the inputted value (step S210). The production control unit 11 then sets the maintenance time Tm to be later than the production end time Te (step S220). This is because it suffices to carry out necessary maintenance after the production ends, since a breakdown in the manufacturing machines MA, MB, MC, MD is not scheduled in the production planning stage and therefore there is no possibility of replacing a component until the production end time Te. Therefore, the relationship between the production end time Te and the maintenance time Tm at the time when the production plan is inputted is Tm>Te, as shown in FIG. 3.

Subsequently, the production control unit 11 drives the respective manufacturing machines MA, MB, MC, MD and execute the production (step S300). In the example shown in FIG. 1, the production is carried out by the two manufacturing machines MA, MB for spot welding and the two manufacturing machines MC, MD for painting. However, the production by the two manufacturing machines MA, MB for spot welding will now be described for the sake of convenience of the description. The two manufacturing machines MA, MB operate by the amounts of operation JA, JB shown in FIG. 3. Specifically, it is assumed that the manufacturing machine MA is responsible for spot welding at ten sites on the left side in the illustration of the workpiece WK and performs welding for a predetermined operation time and at a predetermined work speed, and that the manufacturing machine MB is responsible for spot welding at ten sites on the right side in the illustration of the workpiece WK and performs welding for a predetermined operation time and at a predetermined work speed. Both have ten welded sites. However, since the total distance of the welded points by the manufacturing machine MB is longer than the total distance of the welded points by the manufacturing machine MA, the work speed of the manufacturing machine MA is lower than the work speed of the manufacturing machine MB on the assumption that the two manufacturing machines have the same takt time or that spot welding is completed in a takt time such that the difference between their takt times appears for the first time. Consequently, the amount of operation JA of the manufacturing machine MA is set to be lower than the amount of operation JB of the manufacturing machine MB. In this state, the production is executed by the two manufacturing machines MA, MB.

Next, the production control unit 11 executes breakdown response processing (step S400). FIG. 5 shows details of this processing. In the breakdown response processing, the production control unit 11 performs processing to receive the quantity of state from the data collection devices 36 to 39 of the manufacturing machines MA, MB, MC, MD while continuing the production (step S410). The quantity of state includes the torque or the number of rotations of the motor or the like forming the manufacturing machines MA, MB, MC, MD, the electric power required for this, and the drive shaft of the motor or the like, as described already.

The production control unit 11 determines whether there is a sign of a breakdown or not, based on the received quantity of state (step S420). The sign of a breakdown may be directly detected from the received quantity of state, for example, that vibration on the rotation shaft is of a predetermined intensity or higher, or may be detected from information of feedback control included in the received quantity of state, or the like. To take the motor of the manufacturing machines MA, MB as an example, the manufacturing machines MA, MB perform feedback control when the actual number of rotations of the motor or the actual torque does not coincide with a number of rotations of the motor or a target value of torque that is given. In cases such as when the time until the number of rotations or the torque coincides with a target value via feedback control departs from a set value, it can be regarded that the possibility of a breakdown in the drive system of the motor is increased, and therefore a sign of a breakdown may be detected. When no particular sign of a breakdown is detected from the received quantity of state in step S420 (NO in step S420), the production control unit 11 exits to "NEXT" and ends the breakdown response processing.

Meanwhile, when a sign of a breakdown is detected (YES in step S420), the production control unit 11 performs data analysis (step S430). The data analysis is processing to analyze the quantity of state received from the data collection devices 36, 37 of the manufacturing machines MA, MB and learn the status of progress of the sign of the breakdown or the like. The production control unit 11 repeatedly receives the quantity of state from the data collection devices 36, 37 from the start of the production. Therefore, when a sign of a breakdown is detected, the production control unit 11 can learn the status of progress of the sign of the breakdown by analyzing the past data. For example, when vibration on the rotation shaft gradually increases, the production control unit 11 can predict at what point the manufacturing device becomes unsuitable for production on the assumption that the vibration keeps increasing. The same applies to the status of feedback control or the like. In this way, a breakdown not only means that one of the manufacturing machines actually stops operating, but also includes a circumstance unsuitably for production. For example, when vibration on the rotation shaft of the motor increases, the accuracy of spot welding drops and the welded workpiece WK may be determined as a defective product. Also, when a delay in feedback control increases, welding is not completed within the takt time and the conveyor 15 may need to stop or its transport speed may need to be lowered. In such cases, too, it is determined as a breakdown in the manufacturing device.

Thus, the production control unit 11 performs processing to predict a breakdown time Td, using the result of analyzing data (step S440). The prediction of the breakdown time Td may be carried out by a technique of finding a period until a time when the sign of the breakdown is predicted to exceed a threshold, based on the status of progress of the sing of the breakdown, or may be carried out with reference to data until a time actually determined as having a breakdown in the progress of a sign of a similar breakdown in the past, when such data exists.

After finding the breakdown time Td, the production control unit 11 requests the production headquarters 20 to perform breakdown response, and acquires the maintenance time Tm from the production headquarters 20 (step S450). Specifically, the production control unit 11 places an order with the production headquarters 20 for a component, in order to replace the component for which the breakdown time Td is predicted. The production headquarters 20 acquires the time of delivery of a replacement component from the component supply unit 30 by the ordering processing (step S170) shown in FIG. 2 and outputs this as the maintenance time Tm (step S180). Thus, the production control unit 11 can receive the maintenance time Tm in the ordering processing (step S450).

The production control unit 11 determines whether the received maintenance time Tm is greater than the breakdown time Td or not (step S460). When it is determined that the maintenance time Tm is greater than the breakdown time Td, that is, a breakdown occurs before a replacement component is delivered and one of the manufacturing machines becomes unavailable for use (YES in step S460), the production control unit 11 performs processing to correct the allocation of the amount of operation (step S470). After correcting the allocation of the amount of operation, the production control unit 11 exits to "NEXT" and ends the breakdown response processing. Thus, the processing of step S230 onward shown in FIG. 4 is executed. The correction of the allocation of the amount of operation is reflected from the timing when the processing to execute the production (step S300) is carried out in the processing of step S230 onward. That is, the change in the amount of operation of each manufacturing machine and hence productivity is carried out, starting from the time when the production plan is changeable.

Figure 6:
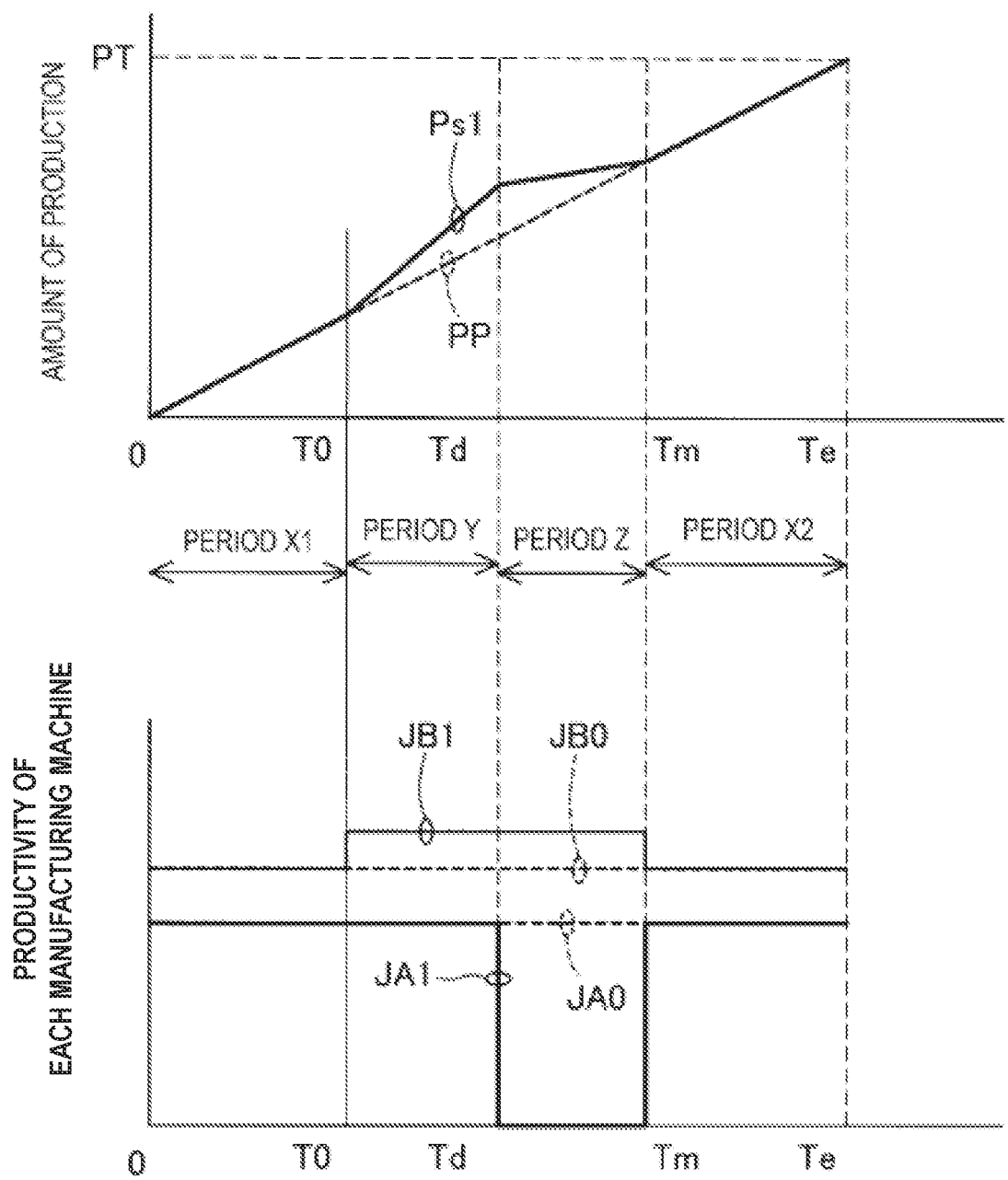
FIG. 6 is a graph showing a transition of the amount of production in the production system according to the first embodiment, and the amount of operation of each manufacturing machine to achieve this.

Now, an example of the correction of the allocation of the amount of operation will be described with reference to FIG. 6. Here, it is assumed that a sign of a breakdown in the manufacturing machine MA is detected. It is assumed that the maintenance time Tm is greater than the breakdown time Td, that is, the maintenance time Tm is temporally later than the breakdown time Td, as a result of data analysis based on the detected sign of the breakdown. FIG. 6 is a graph showing a transition of the amount of production in such a case, and the amount of operation of each manufacturing machine to achieve this. As each manufacturing machine, only the manufacturing machines MA, MB for spot welding are employed.

FIG. 6 shows a case where production is carried out without changing the amount to produce until the end of production, that is, a target amount of production PT, regardless of the presence/absence of a sign of a breakdown. During a period X2 to the end of production after the maintenance Tm, a component is replaced and therefore the same production as in a period X1 until a sign of a breakdown is detected can be carried out. Therefore, the production control unit 11 corrects the amount of operation of each of the manufacturing machines MA, MB during the period from a time point T0 when a sign of a breakdown is detected to the maintenance time Tm. Of this period, the period from the time point T0, when a sign of a breakdown is detected, to the breakdown time Td, which is the time point when the breakdown will occur, is referred to as a period Y. A period from the breakdown time Td to the maintenance time Tm is referred to as a period Z.

During the period Z, a breakdown occurs in the manufacturing machine MA at the breakdown time Td and therefore the manufacturing machine MA cannot be used until the maintenance time Tm. During the period Z, only the manufacturing machine MB carries out production and therefore the production capability decreases. Thus, in this embodiment, the production capability is increased during the period Y, which is before the period Z. The increase in the production capability during the period Y is achieved by correcting the amount of operation of the manufacturing machines MA, MB. The correction of the amount of operation will be summarized later and described collectively for a plurality of embodiments. In any case, correcting the amount of operation of the manufacturing machines during the periods Y and Z secures the amount of production from the start of the production to the production end time Te. In this embodiment, the amount of operation of the manufacturing machines is corrected during the periods Y and Z so as to correct the amount of production to achieve the amount of production according to the initial production plan. However, the amount of operation may be corrected during the period X2 so as to correct the amount of production to achieve the amount of production according to the initial production plan. However, it is preferable to correct the amount of production during the period Z, considering the possibility of a productivity drop due to another factor such as a sign of a breakdown in another manufacturing device.

In this way, when a sign of a breakdown is detected in the breakdown response processing shown in FIG. 5, the amount of operation may be corrected, based on the relationship between the maintenance time Tm and the breakdown time Td. However, when the maintenance time Tm is equal to or less than the breakdown time Td (NO in step S460), there is a high possibility that maintenance is carried out to enable the production to continue as a replacement component is delivered before the manufacturing machine breaks down. Therefore, the production control unit 11 carries out no further processing, exits to "NEXT", and ends the processing. In this case, the production using the manufacturing machines MA, MB, MC, MD is continued until the end of the production. Meanwhile, in practice, it takes some time to replace a component and therefore there is a possibility that the amount of operation and the amount of production drop accordingly. However, it is now assumed that the time required for the component replacement is negligibly short in view of the amount of production or that a component can be replaced within a daily regular maintenance time. Therefore, the time required for the maintenance is not taken into consideration. Of course, the amount of operation may be corrected in consideration of the time required for the component replacement or the like.

As the breakdown response processing ends, the production control unit 11 then determines whether it is the breakdown time Td or not (step S230). When it is the breakdown time Td, the production control unit 11 assumes that the period Y has passed, and carries out processing to change the allocation of the amount of operation for the period Z (step S240). Here, even when a breakdown does not actually occur, the amount of operation is changed when it is the breakdown time Td. This is because a determination not to extend the period Y is made since the amount of operation of the manufacturing machine MB where a sign of a breakdown is not detected is increased during the period Y. Of course, since no breakdown occurs, the amount of operation of the manufacturing machines MA, MB may be returned to the amount of operation in the period X1. Also, when a breakdown actually occurs before the breakdown time Td, detection may be carried out by the determination in step S230. In this case, the manufacturing machine MA cannot be used and therefore the amount of operation is changed to the amount of operation for the period Z.

When it is not the breakdown time Td yet (NO in step S230) or after the allocation of the amount of operation is changed as it is the breakdown time Td (step S240), the production control unit 11 then determines whether it is the maintenance time Tm or not (step S250). When there is no sign of a breakdown, the determination in step S250 results in "NO" because the maintenance time Tm is later than the production end time Te, as described already. Therefore, the production control unit 11 determines whether the production has finished or not (step S260) without performing maintenance processing (step S500). Then, the production control unit 11 returns to step S300 and repeats the foregoing processing including the execution of production and the breakdown response processing (step S400) and the like.

As the processing is thus repeated with the allocation of the amount of operation of each of the manufacturing machines MA, MB corrected, the maintenance time Tm eventually comes (YES in step S250). When it is the maintenance time Tm, a replacement component is delivered and the broken component can be replaced. Replacing the component restores the manufacturing machine MA into the operating state. Thus, during the subsequent period X2, the amount of operation similar to the initial amount of operation in the period X1 is restored and the production continues. When it is the production end time Te, the production control unit 11 exits to "END" and stops the operation of the manufacturing machines MA, MB, MC, MD.

C. Allocation, Correction, and Change in Amount of Operation

The allocation of the amount of operation of each of the manufacturing machines MA, MB, and the correction and change in the amount of operation in the above-described production system 100 will now be described all together. FIG. 6 shows the amounts of operation of the manufacturing machines MA, MB in the production system 100 according to the first embodiment. In FIG. 6, dashed lines JA0, JB0 represent the amounts of operation when no sign of a breakdown is detected. These amounts of operation are the same as those shown in FIG. 3. During the period X1 until a sign of a breakdown is detected, and during the period X2 after the maintenance time Tm, that is, after a component is replaced and the normal state is restored, the manufacturing machines MA, MB operate by these amounts of operations JA0, JB0.

Figure 7:
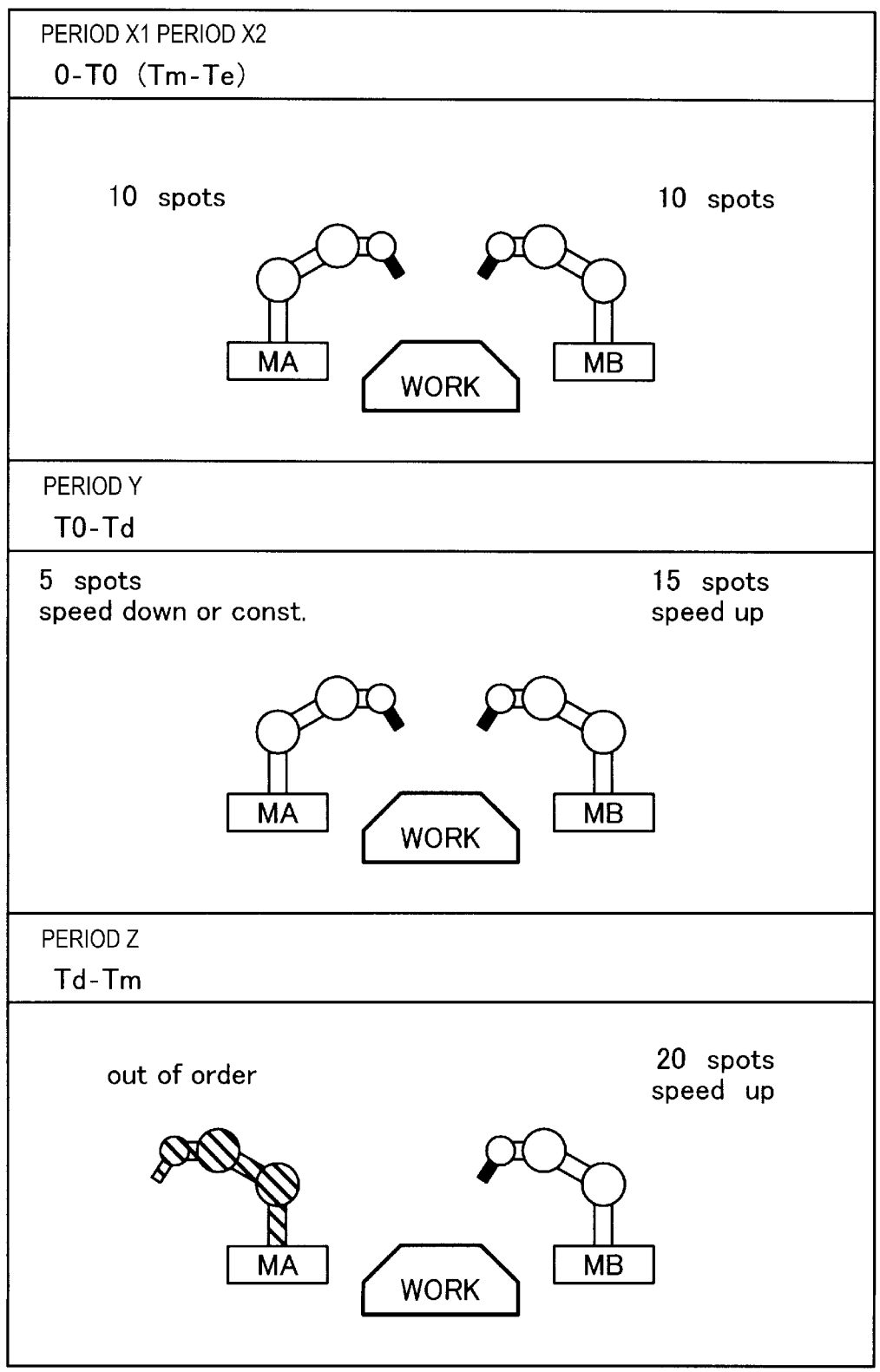
FIG. 7 is an explanatory view showing the number of welded sites and the speed of moving between spot-welded sites of each manufacturing machine in the first embodiment over separate periods.

FIG. 7 shows the number of welded sites and the speed of moving between spot-welded sites of the manufacturing machines MA, MB over separate periods. During the periods X1, X2, the number of spot-welded sites is ten for both the manufacturing machines MA, MB. Next, when a sign of a breakdown is detected and the breakdown time Td is predicted, during the period Y, the amount of operation of the manufacturing machine MA is maintained at approximately the same level as in the period X1 and the amount of operation of the manufacturing machine MB is increased. Consequently, the productivity as the amount of production per unit time during the period Y increases. This corresponds to that a line Ps1 showing the amount of production in the graph of FIG. 6 has a large gradient in the period Y. Specifically, the number of spot-welded sites of the manufacturing machine MA, for which a sign of a breakdown is detected, is corrected to five, and the number of spot-welded sites of the manufacturing machine MB, for which no sign of a breakdown is detected, is corrected to 15. In this case, for the manufacturing machine MA, since the number of spot-welded sites is reduced, the work is finished within a shorter takt time than the previous takt time but the movement speed by the motor is made lower than in the periods X1, X2 (down) or maintained at the previous speed (const.). Since the number of spot-welded sites is reduced, the manufacturing machine MA can increase the amount of production by reducing the takt time without increasing the speed. Although the amount of operation of the manufacturing machine MA in this case is shown as the same as in the period X1, the amount of operation may be regarded as reduced. Meanwhile, for the manufacturing machine MB, since the number of spot-welded sites is increased to 15, the movement speed by the motor is made higher than in the periods X1, X2 (up) in order to finish the work within a shorter time than the previous takt time. At this time, the amount of operation of operation of the manufacturing machine MB is corrected to a greater amount of operation as denoted by the amount of operation JB1 in FIG. 6.

During the period Z from the breakdown time Td to the maintenance time Tm, not only when a breakdown actually occurs in the manufacturing machine MA but also when a breakdown does not occur, the operation of the manufacturing machine MA is stopped. Therefore, the amount of operation of the manufacturing machine MA is at the value 0. Meanwhile, the amount of operation of the manufacturing machine MB is maintained at the same level as in the period Y. However, the manufacturing machine MB is changed to be responsible for all the spot-welded sites, that is, 20 sites. In this case, since the manufacturing machine MB carries out spot welding at all the 20 sites, the spot welding on the workpiece WK is completed but the work is not completed within the takt time. Therefore, the productivity drops becomes lower than not only in the period Y but also in the period X1, as shown in FIG. 6. This corresponds to that the gradient of the line Ps1 showing the amount of production in the graph of FIG. 6 is smaller in the period Z than in the other periods X1 and Y.

When the maintenance time Tm comes, a component is replaced. Therefore, the manufacturing machines MA, MB return into the normal state and the original amount of operation is restored. Thus, the productivity becomes similar to that in the period X1, and production is carried out with this productivity during the period X2 until the production end time Te.

The amount of operation during the periods Y and Z of each of the manufacturing machines MA, MB in the first embodiment is summarized below. Here, a comparison using the terms "longer", "shorter", "faster", and "slower" is a comparison with the operation distance and the work speed in the period X1.

(1) Period Y
Manufacturing machine MA: shorter operation distance, slower or constant work speed, lower load
Manufacturing machine MB: longer operation distance, faster work speed, higher load (2) Period Z
Manufacturing machine MA: stop
Manufacturing machine MB: longer operation distance, faster work speed, longer takt time The work speed of the manufacturing machine may be constant or slower, provided that a required productivity is achieved.

D. Effects of First Embodiment

In the above first embodiment, during the period after a sign of a breakdown in the manufacturing machine MA is detected until the breakdown time Td when a breakdown is predicted to occur, the amount of operation of the manufacturing machine MA is not reduced and the amount of operation of JB0 of the manufacturing machine MB is slightly increased to the amount of operation JB1, thus increasing the productivity in this period Y. Therefore, even when the use of the manufacturing machine MA is stopped at the breakdown time Td and the production is continued by the manufacturing machine MB alone during the period Z to the maintenance time Tm, the amount of production at the point of the maintenance time Tm is not significantly lower than in the case where no breakdown occurs in the manufacturing machine MA. During this time, the manufacturing machine MB operates by the amount of operation JB1 and therefore the speed of the motor or the like is increased. However, since the amount of operation of the manufacturing machine MA is not actively reduced, the amount of operation of the manufacturing machine MB can be increased with restraint. This can avoid a circumstance where the manufacturing machine MB breaks down before the production end time Te.

In the embodiment, at the point of the breakdown time Td, the operation of the manufacturing machine MA is stopped even when the manufacturing machine MA does not actually break down. However, the manufacturing machine MA can operate until a breakdown actually occurs. In that case, the productivity until the maintenance time Tm is higher than in the example shown in FIG. 6 and measures such as making the end time Te earlier can be taken. In the embodiment, it is assumed that when one manufacturing machine breaks down, the other manufacturing machine (in this example, the manufacturing machine MB) carries out all the work as a substitute (period Z in FIG. 7). However, the example where all the work of one manufacturing machine is carried out by the other manufacturing machine as a substitute is not limiting. For example, when three manufacturing machines operate, another manufacturing machine as a substitute may be able to carry out at least a part of the work of the broken manufacturing machine. When there is work that is not carried out by this another manufacturing machine as a substitute, the work can be carried out by the other manufacturing machine as a substitute. In some cases, a worker may carry out the rest of the work. This relationship similarly applies to other embodiments described below.

E. Second and Third Embodiments

In the first embodiment, the amount of operation during the period Y of the manufacturing machine MA, where a sign of a breakdown is detected, is not reduced, and the amount of operation of the other manufacturing machine MB is increased to raise the productivity during the period Y, thus preventing a reduction in the amount of production in the production system 100 until the production end time Te. Several other embodiments are conceivable as measures to prevent a reduction in the amount of production until the production end time Te.

(1) Second Embodiment

Figure 8:
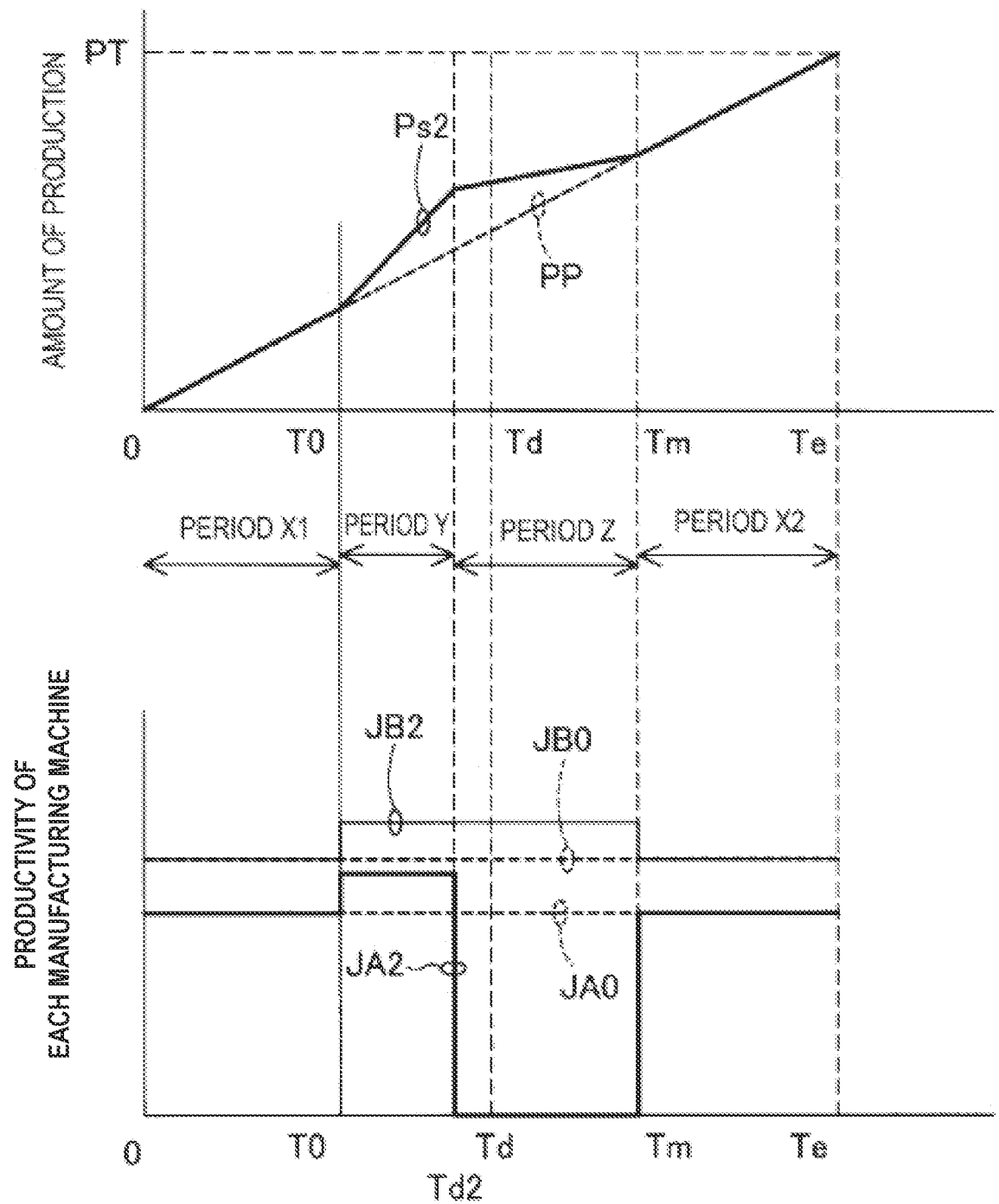
FIG. 8 is a graph showing a transition of the amount of production in a production system according to a second embodiment, and the amount of operation of each manufacturing machine to achieve this.
Figure 9:
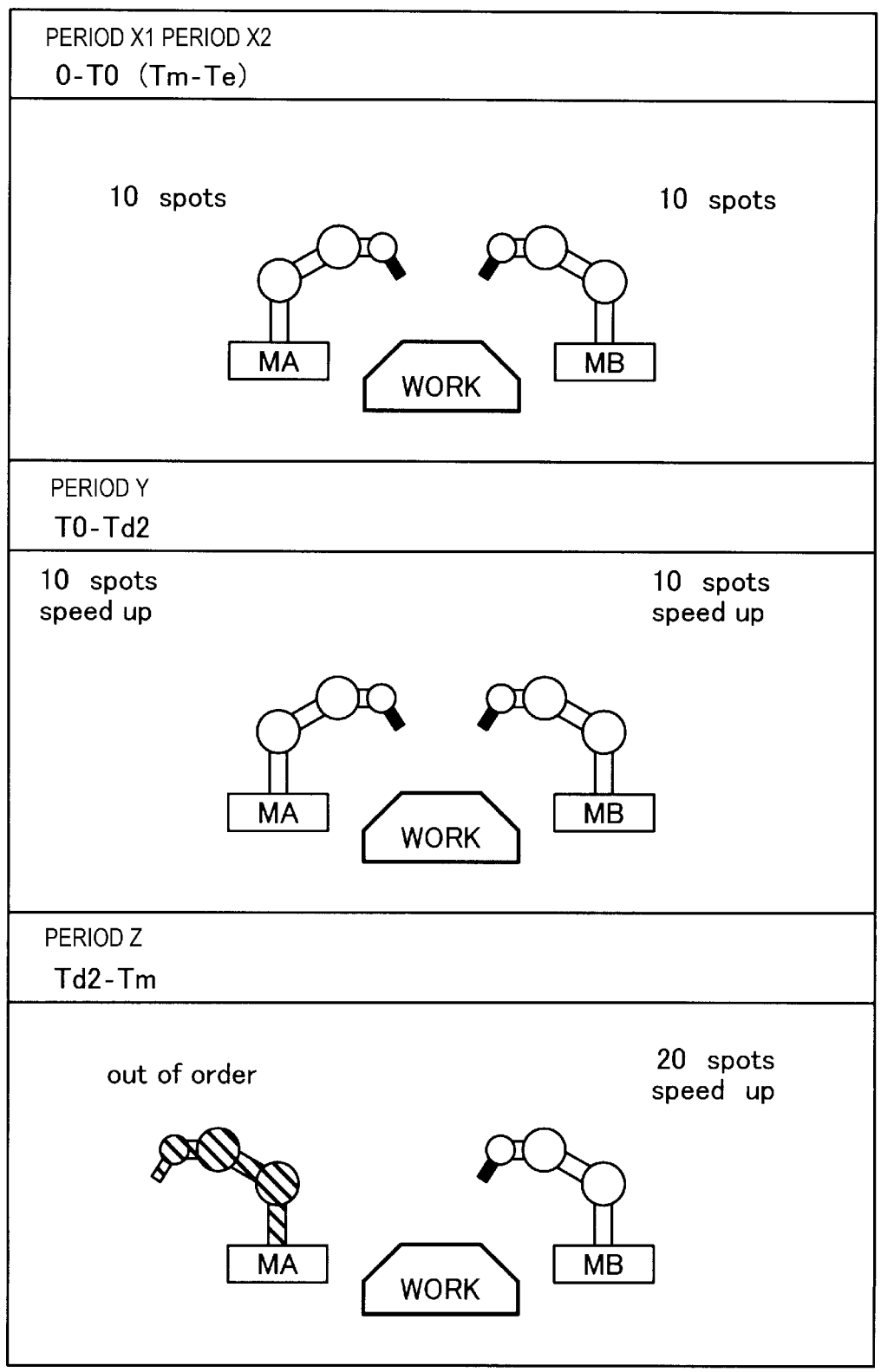
FIG. 9 is an explanatory view showing the number of welded sites and the speed of moving between spot-welded sites of each manufacturing machine in the second embodiment over separate periods.

A second embodiment is different from the first embodiment in that when a sign of a breakdown in the manufacturing machine MA is detected, the amount of operation of the manufacturing machine MA during the period Y until a breakdown actually occurs is increased. FIG. 8 shows how it is done. In this example, both of the amounts of operation of the manufacturing machine MA, where a sign of a breakdown is detected, and the other manufacturing machine MB, are increased as denoted by JA2, JB2 in the illustration. Specifically, the amount of operation of the manufacturing machines MA, MB during the period Y is ten spot-welded sites each, and the speed of the motor of each manufacturing machine is increased, as shown in FIG. 9. Thus, the takt time decreases and the productivity during this period Y becomes higher than the productivity during the period Y in the first embodiment. This corresponds to that the gradient in period Y of a line Ps2 showing the amount of productivity in FIG. 8 is greater than the gradient in the period Y in FIG. 6. The amount of operation of each manufacturing machine during the other periods X1, Z, X2 is similar to that in the first embodiment.

The amount of operation during the periods Y and Z of each of the manufacturing machines MA, MB in the second embodiment is summarized below. Here, a comparison using the terms "longer", "shorter", "faster", and "slower" is a comparison with the operation distance and the work speed in the period X1, as in the first embodiment.

(3) Period Y

Manufacturing machine MA: constant operation distance, faster work speed, higher load Manufacturing machine MB: constant operation distance, faster work speed, higher load (4) Period Z Manufacturing machine MA: stop Manufacturing machine MB: longer operation distance, faster work speed, longer takt time The work speed of the manufacturing machine may be constant or slower, provided that a required productivity is achieved.

As shown in FIG. 8, increasing the speed of the motor in order to increase the amount of operation of the manufacturing machines MA, MB when a sign of a breakdown is detected increases the possibility that the breakdown time Td of the manufacturing machine MA becomes temporally earlier than in the case where the amount of operation is not increased. In this embodiment, this point is also analyzed in the data analysis (step S430 in FIG. 5) and the time when a breakdown occurs is predicted as a breakdown time Td2. Therefore, the breakdown time Td2 in this embodiment is predicted to be earlier than the breakdown time Td shown in FIG. 6 and the period Y is shorter. Also, since the period Y is shorter, the period Z is relatively longer. During the period Z, the production is carried out by the manufacturing machine MB alone and therefore the productivity drops, as in the first embodiment. Consequently, the amount of production over the entire period, including the production with a high productivity during the short period Y and the production with a low productivity during the long period Z, is substantially the same as the amount of production according to the initial production plan.

(2) Third Embodiment

Figure 10:
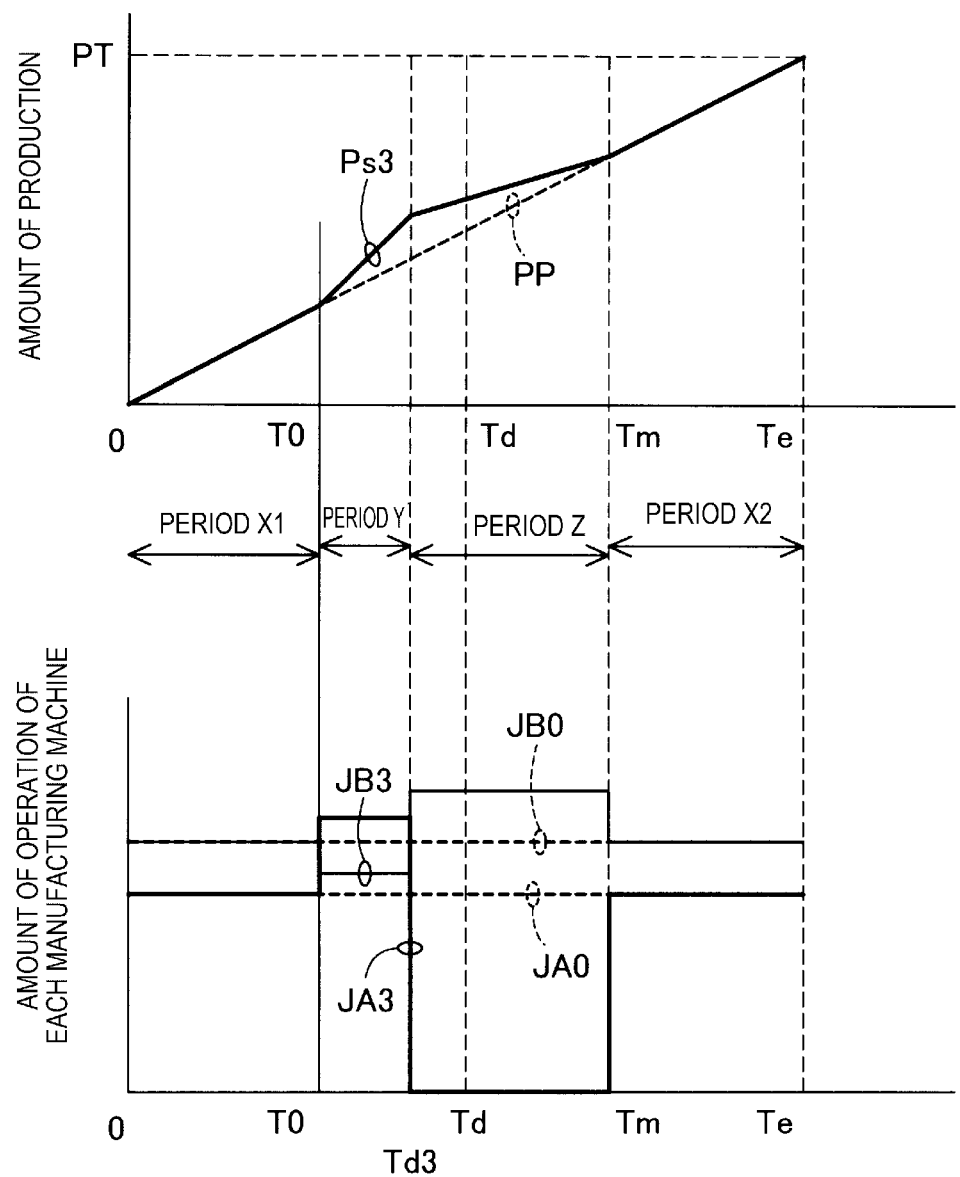
FIG. 10 is a graph showing a transition of the amount of production in a production system according to a third embodiment, and the amount of operation of each manufacturing machine to achieve this.
Figure 11:
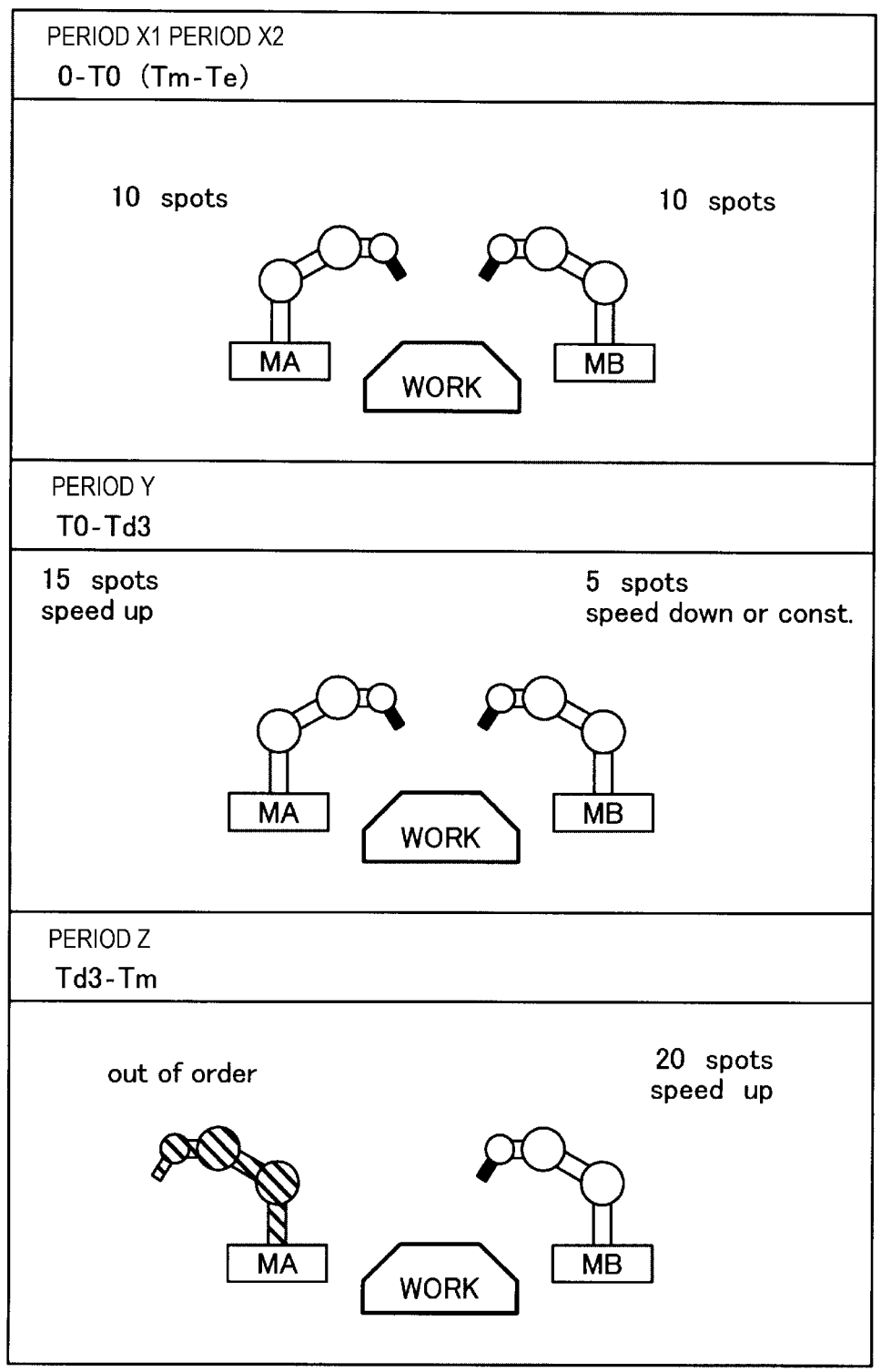
FIG. 11 is an explanatory view showing the number of welded sites and the speed of moving between spot-welded sites of each manufacturing machine in the third embodiment over separate periods.

In a third embodiment, when a sign of a breakdown in the manufacturing machine MA is detected, the amount of operation of the manufacturing machine MA during the period Y until a breakdown actually occurs is increased more than in the second embodiment. Meanwhile, the amount of operation of the manufacturing machine MB during the period Y is reduced to less than the amount of operation during the period X1. FIG. 10 shows how it is done. In this example, the amount of operation of the manufacturing machine MA, where a sign of a breakdown is detected, is increased to JA3 in the illustration, and the amount of operation of the other manufacturing machine MB is reduced to JB3 in the illustration. Specifically, the amount of operation of the manufacturing machine MA during the period Y is 15 spot-welded sites, and the drive speed of an arm or the like by the motor is increased, as shown in FIG. 11. Meanwhile, the amount of operation of the manufacturing machine MB during the period Y is five spot-welded sites, and the drive speed of an arm or the like by the motor is made lower than or kept the same as the previous speed. Thus, the takt time is reduced and the productivity during this period Y is even higher than the productivity during the period Y in the second embodiment. This corresponds to that the gradient of a line Ps3 showing the amount of production in FIG. 10 is greater than the gradient in the period Y in FIG. 8.

As shown in FIG. 10, increasing the speed of the motor to higher than in the second embodiment in order to increase the amount of operation of the manufacturing machines MA when a sign of a breakdown is detected increases the possibility that the breakdown time Td of the manufacturing machine MA becomes temporally earlier than in the case where the amount of operation is not increased. In this embodiment, this point is also analyzed in the data analysis (step S430 in FIG. 5) and the time when a breakdown occurs is predicted as a breakdown time Td3. Therefore, the breakdown time Td3 in this embodiment is predicted to be earlier than the breakdown time Td2 shown in FIG. 8 and the period Y is even shorter. Also, since the period Y is shorter, the period Z is relatively longer. During the period Z, the production is carried out by the manufacturing machine MB alone and therefore the productivity drops, as in the first embodiment.

The amount of operation during the periods Y and Z of each of the manufacturing machines MA, MB in the third embodiment is summarized below.

(5) Period Y

Manufacturing machine MA: longer operation distance, faster work speed, higher load Manufacturing machine MB: shorter operation distance, slower or constant work speed, lower load (6) Period Z Manufacturing machine MA: stop Manufacturing machine MB: longer operation distance, faster work speed, longer takt time In the third embodiment, as a result of the above productivity increase control, the amount of production over the entire period, including the production with a high productivity during the short period Y and the production with a low productivity during the long period Z, is substantially the same as the amount of production according to the initial production plan.

F. General Solution

In the above embodiments, two manufacturing machines are employed, and when a sign of a breakdown in one manufacturing machine MA is detected, the amount of operation of each manufacturing machine during the period Y is increased, thus improving productivity. As for how the amount of operation of the manufacturing machine should be adjusted in order to improve productivity, a general solution can be found by the following equations. Therefore, the production system may include any number of manufacturing machines. Also, the type of manufacturing machine is not limited to the spot welding machine or painting machine. Any type of manufacturing machine that can form the production system and that can be combined with a manufacturing machine which can carry out work of another manufacturing machine as a substitute may be employed, such as an assembling machine assembling components, a soldering machine, a parts feeder, a press machine, an injection molding machine, or a robot.

A real productivity Pi of an i-th manufacturing machine Mi of the respective manufacturing machines where the operation of the manufacturing machine Mi is defined by operation time and work speed can be expressed as:

$$Pi=Pi(ti,vi)-\{\alpha(ti)+\beta(vi)\} \quad (1).$$

Pi (ti, vi) is the theoretical productivity where the manufacturing machine Mi operates for an operation time ti at a work speed vi. $\alpha(ti)$ expresses a drop in the productivity due to a component replacement cycle and expresses that it depends on the operation time ti of the manufacturing machine Mi. $\beta(vi)$ expresses a drop in the productivity due to the occurrence of a defective product and expresses that it depends on the work speed vi of the manufacturing machine Mi. Therefore, the real productivity Pi is the value of the theoretical productivity Pi(ti,vi) minus the drop in the productivity due to the component replacement and the occurrence of a defective product.

It is assumed that an initial value of the productivity of the manufacturing machine Mi, that is, an initial production plan, is made, with an initial value ti0 allocated as the operation time and an initial value vi0 allocated as the work speed of the manufacturing machine Mi. In this case, an initial value Pi0 of the productivity of the manufacturing machine Mi can be expressed as:

$$Pi0=Pi(ti0,vi0)-\{\alpha(ti0)+\beta(vi0)\} \quad (2).$$

The initial value Pi0 expresses the productivity where the operation time of the manufacturing machine Mi is ti0 and where the work speed is vi0.

The productivity Pi of the manufacturing machine Mi expressed by the equation (1) changes substantially linearly, when the operation time ti or the work speed vi of the manufacturing machine Mi changes. Here, it is assumed that the proportions of the operation time ti and the work speed vi to the initial values ti0, vi0 are defined as $\Delta ti=ti/ti0$ and $\Delta vi=vi/vi0$. Thus, a variation $\Delta Pi$ from the initial value Pi0 of the productivity Pi of the manufacturing machine Mi can be expressed as:

$$\Delta Pi=Pi0\times\Delta ti+Pi0\times\Delta vi-\{\alpha(\Delta ti)+\beta(\Delta vi)\} \quad (3).$$

The first term on the right-hand side represents a variation in the productivity due to a variation in the operation time of the manufacturing machine Mi. The second term on the right-hand side represents a variation in the productivity due to a variation in the work speed of the manufacturing machine Mi. The third term on the right-hand side represents a variation in the drop in the productivity due to the component replacement cycle dependent on the operation time. The fourth term on the right-hand side represents a variation in the drop in the productivity due to a variation in the occurrence of a defective product dependent on the work speed.

When correcting the amount of operation of each manufacturing machine when a sign of a breakdown is detected, as described in the embodiments, it is utilized that the productivity of the entirety of the production system 100 is the minimum value of each productivity Pi of each manufacturing machine Mi (i=1 to n) after correction, that is, that the productivity PP of the entirety of the production system 100 is expressed as:

$$Ps=\min(P1,P2,\ldots Pn) \quad (4).$$

In order to increase the productivity Ps during the period Y to a desired productivity Psi, the operation time ti and the work speed vi of each manufacturing machine Mi can be found by solving the equation (4) with a restraining condition of $\Sigma^n_{i=1}\Delta Pi\geq 1$, that is $(\Delta P1+\Delta P2+\ldots \Delta Pn)\geq 1$, so that the productivity Ps has a desired value.

G. Other Embodiments

[1] Also, the technique can be implemented in the following configurations. According to a first aspect, a production system operating a plurality of manufacturing machines, based on a plan of an amount of production, is provided. The production system includes: a first manufacturing machine being one of the plurality of manufacturing machines and carrying out first work; a second manufacturing machine being one of the plurality of manufacturing machines and carrying our second work, the second manufacturing machine being configured to carry out, as a substitute, at least a part of the first work of the first manufacturing machine; a planning unit planning a total productivity that is a total productivity of the first and second manufacturing machines, according to a total amount of production planned as an amount of production for a predetermined period; a detection unit acquiring a quantity of state representing an operation state from the first manufacturing machine, and detecting a sign of a breakdown in the first manufacturing machine; a prediction unit predicting a stop time that is a time when operation of the first manufacturing machine stops due to the breakdown, when the detection unit detects the sign of the breakdown; a decision unit deciding a maintenance time that is a time when the first manufacturing machine stopping operating due to the breakdown can be returned into an operating state; and a production control unit controlling an amount of operation of each of the first manufacturing machine and the second manufacturing machine in such a way as to achieve a first total productivity that is the total productivity planned by the planning unit. When the sign of the breakdown in the first manufacturing machine is detected and the predicted stop time is earlier than the maintenance time, the production control unit controls at least the amount of operation of the first manufacturing machine to be equal to or greater than an amount of operation before the sign of the breakdown is detected, and the production control unit performs productivity increase control to set a second total productivity higher than the first total productivity, as the total productivity to the stop time.

According to this production system, when a sign of a breakdown in the first manufacturing machine is detected, up to the maintenance time, at least the amount of operation of the first manufacturing machine is controlled to be equal to or greater than the amount of operation before the sign of the breakdown is detected. Thus, as the total productivity to the stop time, the second total productivity higher than the total productivity can be set. Therefore, even when a sign of a breakdown is detected, a reduction in the amount of production from the production plan of the production system can be restrained.

Such a production system may be separated between a production headquarters and a plant or may be integrated between them. For example, the production control unit of the plant may perform the ordering of a replacement component and the decision on the maintenance time all together. Also, a person in charge may manually perform the decision on the maintenance time and input the decision to the production system.

[2] In such a production system, the production control unit may perform, as the productivity increase control, control to maintain the amount of operation of the first manufacturing machine at the same amount of operation as the amount of operation before the sign of the breakdown is detected, and to increase the amount of operation of the second manufacturing machine to an amount of operation that achieves the second total productivity. Thus, the productivity of the production system can be increased without increasing the amount of operation of the first manufacturing machine where the sign of the breakdown is detected. Therefore, the possibility that the first manufacturing machine can operate until the predicted breakdown time can be increased.

[3] In such a production system, the production control unit may perform, as the productivity increase control, control to increase the amount of operation of the first manufacturing machine to greater than the amount of operation before the sign of the breakdown is detected, and to set an amount of operation that achieves the second total productivity, as the amount of operation of the second manufacturing machine. Thus, an increase in the amount of operation of the second manufacturing machine can be restrained and the load on the second manufacturing machine can be restrained. As the combination of the amounts of operation of the first manufacturing machine and the second manufacturing machine in the productivity increase control, any combination that can control at least the amount of operation of the first manufacturing machine to be equal to or greater than the amount of operation before a sign of a breakdown is detected and that can then set the second total productivity higher than the first total productivity, as the total productivity to the stop time, may be employed.

[4] In such a production system, the production control unit may perform the productivity increase control from a time when the production plan can be changed. The production system operates as a system and therefore can smoothly change the amount of operation by setting the timing of being able to change the amount of operation of each manufacturing machine, from the time when the production plan can be changed. Also, the amount of operation may be changed from the time point when the change in the amount of operation is found by calculation.

[5] Such a production system may further include an operation information acquisition unit acquiring operation information of the first manufacturing machine. The detection unit may detect the sign of the breakdown, using the operation information of the first manufacturing machine. Thus, the sign of the breakdown in the first manufacturing machine can be easily detected. Also, the sign of the breakdown may be detected based on a signal from a monitoring camera or sensor placed outside the manufacturing device.

[6] Such a production system may further include: a specifying unit specifying a component to be replaced in order to avoid or repair the breakdown in the first manufacturing machine, based on the sign of the breakdown detected by the detection unit; and a replacement component management unit managing a delivery schedule of the specified component to be replaced. The decision unit may decide the maintenance time according to the delivery schedule of the component to be replaced. Thus, the maintenance time can be easily decided. Also, the maintenance time may be decided without specifying a replacement component. For example, the maintenance time may be decided on the assumption that the entirety of manufacturing machine where a sign of a breakdown is detected is to be replaced.

[7] In such a production system, the prediction unit may predict the stop time according to the amount of operation of the first manufacturing machine controlled by the productivity increase control. This is because changing the amount of operation of the first manufacturing machine to the maintenance time can cause a change in the stop time when the first manufacturing machine stops as a breakdown actually occurs.

[8] In such a production system, the production control unit may correct the second total productivity to the stop time and a third total productivity that is a total productivity from the stop time to the maintenance time in such a way as to achieve a total amount of production equivalent to a total amount of production by the first and second manufacturing machines operating with the first total productivity to the maintenance time. Thus, the amount of production of the production system as a whole can be secured even when the first manufacturing machine stops due to a breakdown.

[9] According to a second aspect, a production method for operating a plurality of manufacturing machines, based on a plan of an amount of production, is provided. The production method includes: planning a total productivity that is a total productivity of a first manufacturing machine being one of the plurality of manufacturing machines and a second manufacturing machine configured to carry out, as a substitute, at least a part of work of the first manufacturing machine; detecting a sign of a breakdown in the first manufacturing machine; predicting a stop time that is a time when operation of the first manufacturing machine stops due to the breakdown, when the sign of the breakdown is detected; deciding a maintenance time that is a time when the first manufacturing machine stopping operating due to the breakdown can be returned into an operating state; controlling an amount of operation of each of the first manufacturing machine and the second manufacturing machine in such a way as to achieve a first total productivity that is the planned total productivity; and controlling at least the amount of operation of the first manufacturing machine to be equal to or greater than an amount of operation before the sign of the breakdown is detected and setting a second total productivity higher than the first total productivity as the total productivity to the stop time, when the sign of the breakdown in the first manufacturing machine is detected and the predicted stop time is earlier than the maintenance time. This can achieve effects similar to those of the production system.

The present disclosure is not limited to the foregoing embodiments and can be implemented with various configurations without departing from the spirit and scope of the present disclosure. For example, a technical feature in an embodiment corresponding to a technical feature in each form described in the summary can be replaced or combined according to need, in order to solve a part or all of the foregoing problems, or in order to achieve a part or all of the foregoing effects. Also, the technical feature can be deleted according to need, unless described as essential in the specification. For example, a part of a configuration implemented by hardware in the embodiments can be implemented by software. Also, at least a part of a configuration implemented by software can be implemented by a discrete circuit configuration.

What is claimed is:

1. A production system operating a plurality of manufacturing machines, based on a plan of an amount of workpieces to be produced during a predetermined period, the production system comprising:
    a first manufacturing machine being one of the plurality of manufacturing machines and carrying out a first process on the workpieces, a productivity of the first manufacturing machine being a number of workpieces per unit time that the first manufacturing machine performs the first process on;
    a second manufacturing machine being one of the plurality of manufacturing machines and carrying out a second process on the workpieces, a productivity of the second manufacturing machine being a number of workpieces per unit time that the second manufacturing machine performs the second process on, the second manufacturing machine being configured to carry out, as a substitute, at least a part of the first process on the workpieces;
    a planner, implemented by one or more processors, planning an original first productivity of the first manufacturing machine and an original second productivity of the second manufacturing machine, based on the plan of the workpieces to produce during the predetermined period;
    a detector acquiring an operation state from the first manufacturing machine, and detecting a sign of a breakdown in the first manufacturing machine based on the operation state;
    a predictor, implemented by one or more processors, predicting a stop time when operation of the first manufacturing machine is predicted to stop due to the breakdown, in response to that the detector detects the sign of the breakdown;
    a decider, implemented by one or more processors, deciding a maintenance time when the first manufacturing machine stopping operating due to the breakdown can be returned into an operating state; and
    a production controller controlling a productivity of each of the first manufacturing machine and the second manufacturing machine in such a way as to produce the amount of the workpieces during the predetermined period, wherein
    before the sign of the breakdown in the first manufacturing machine is detected, the production controller
        controls the first manufacturing machine to have the original first productivity, and
        controls the second manufacturing machine to have the original second productivity, and
    after the sign of the breakdown in the first manufacturing machine is detected and before the first manufacturing machine breaks down, the production controller
        controls the first manufacturing machine to have an updated first productivity that is greater than the original first productivity by changing an amount of work per unit workpiece involved in the first process performed by the first manufacturing machine, and
        controls the second manufacturing machine to have an updated second productivity that is greater than the original second productivity.

2. The production system according to claim 1, wherein the production controller performs the productivity increase control from a time when the production plan can be changed.

3. The production system according to claim 1, further comprising
    an operation information acquirer, implemented by one or more processors, acquiring operation information of the first manufacturing machine, wherein
    the detector detects the sign of the breakdown, using the operation information of the first manufacturing machine.

4. The production system according to claim 1, further comprising:
    a specifier, implemented by one or more processors, specifying a component to be replaced in order to avoid or repair the breakdown in the first manufacturing machine, based on the sign of the breakdown detected by the detector; and
    a replacement component manager, implemented by one or more processors, managing a delivery schedule of the specified component to be replaced, wherein
    the decider decides the maintenance time according to the delivery schedule of the component to be replaced.

5. The production system according to claim 1, wherein the predicter predicts the stop time according to an amount of operation of the first manufacturing machine controlled by the productivity increase control.

6. The production system according to claim 1, wherein in a period that is after the first manufacturing machine breaks down but before the maintenance time, the second manufacturing machine continues to operate at the updated second productivity.

7. A production method for operating a plurality of manufacturing machines, based on a plan of an amount of workpieces to be produced during a predetermined period, the production method comprising:
    planning an original first productivity of a first manufacturing machine being one of the plurality of manufacturing machines and configured to perform a first process on the workpieces, and planning an original second productivity of a second manufacturing machine configured to perform a second process on the workpieces and configured to carry out, as a substitute, at least a part of the first process carried out by the first manufacturing machine, a productivity of the first manufacturing machine being a number of workpieces per unit time that the first manufacturing machine performs the first process on, a productivity of the second manufacturing machine being a number of workpieces per unit time that the second manufacturing machine performs the second process on;
    acquiring an operation state from the first manufacturing machine and detecting a sign of a breakdown in the first manufacturing machine;
    predicting a stop time when operation of the first manufacturing machine is predicted to stop due to the breakdown, in response to that the sign of the breakdown is detected;
    deciding a maintenance time when the first manufacturing machine stopping operating due to the breakdown can be returned into an operating state;
    before the sign of the breakdown in the first manufacturing machine is detected,
        controlling the first manufacturing machine to have the original first productivity, and
        controlling the second manufacturing machine to have the original second productivity; and
    after the sign of the breakdown in the first manufacturing machine is detected and before the first manufacturing machine breaks down, controlling the first manufacturing machine to have an updated first productivity that greater than the original first productivity by changing an amount of work per unit workpiece involved in the first process performed by the first manufacturing machine, and
controlling the second manufacturing machine to have an updated second productivity that is greater than the original second productivity.

8. The production method of claim 7, wherein in a period that is after the first manufacturing machine breaks down, but before the maintenance time, the second manufacturing machine continues to operate at the updated second productivity.

\* \* \* \* \*